Patented June 10, 1947

2,422,029

UNITED STATES PATENT OFFICE 2,422,029

BICYCLIC COMPOUND CONTAINING A DIPHENYLAMINE NUCLEUS

James G. McNally and Joseph B. Dickey, Rochester, N. Y., assignors to Eastman Kodak Company, Rochester, N. Y., a corporation of New Jersey No Drawing. Application September 2, 1943, Serial No. 500,998

7 Claims. (Cl. 260—397.7)

This invention relates to bicyclic compounds containing a diphenylamine nucleus and more particularly to such compounds attached to the same benzene nucleus of which is only one nitro group, said nitro group being in the ortho position to the diphenylamine nitrogen atom, and a group selected from the group consisting of a sulfonamido group, a sulfonamido group in which a hydrogen atom has been replaced by an alcohol radical and a sulfonamido group in which one hydrogen atom has been replaced by an amino group.

Compounds containing a diphenylamine nucleus in which there are two nitro groups attached to the same benzene nucleus, the nitro groups being in the ortho positions to the diphenylamine nitrogen atom and containing on the same benzene nucleus a phenyl substituted sulfonamide group in the para position to the diphenylamine nitrogen atom have been described by Ullmann in Annalen, vol. 366, page 107 (1909). These prior diphenylamine compounds, we have found, will dye textile materials comprising organic derivatives of cellulose, such as cellulose acetate. However, the dyeing speed is very low and the dyed textile material is not resistant to fading in light.

We have now found new diphenylamine compounds which differ from the prior compounds in containing but one nitro group and in containing on the same benzene nucleus that contains the nitro group, a sulfonamido group, a sulfonamido group in which a hydrogen atom has been replaced by an alcohol radical instead of a phenyl radical, e. g., phenyl, or a sulfonamido group in which one hydrogen atom is replaced by an amino group (i. e., a sulfonhydrazido group). Our new compounds contrary to the action of the prior compounds dye organic derivatives of cellulose, such as cellulose acetate, at a relatively rapid rate and are relatively very stable to light.

It is, accordingly, an object of our invention to provide new diphenylamine compounds. A further object is to provide a process for preparing such compounds. A still further object is to provide materials dyed with such new compounds. Other objects will become apparent hereinafter. In accordance with our invention, we prepare our new diphenylamine compounds by condensing, in the presence of an acid-binding agent, a monocyclic primary aromatic amine of the benzene series with a monocyclic compound containing a benzene nucleus and containing on the benzene nucleus a halogen atom and only one nitro group, said nitro group being in ortho position to the halogen atom, said compound also containing on the benzene nucleus in para position to the halogen atom a group selected from the group consisting of a sulfonamido group and a sulfonamido group in which a hydrogen atom has been replaced by an alcohol radical. Exemplary of the monocyclic primary aromatic amines of the benzene series are aniline, o-anisidine, o-nitroaniline, m-nitroaniline, p-nitroaniline, o-nitro-p-methoxyaniline, o-aminophenol, m-aminophenol, p-aminophenol, m-aminophenoxy acetic acid, o-aminophenoxy acid amide, p-($\beta$-hydroxyethoxy)-aniline, o-($\beta$-sulfatoethoxy)-aniline, o-aminoacetophenone, m-aminoacetophenone, o-nitro-p-chloroaniline, o-nitro-p-fluoroaniline, N-acetyl-N-($\beta$-hydroxyethyl)-o-phenylenediamine and N,N-dimethyl-p-phenylenediamine.

As monocyclic compounds containing a halogen atom, a nitro group and a sulfonamido group, the more readily available chlorine compounds are advantageously employed. These compounds may contain substituents on the benzene ring other than the nitro and sulfonamido groups. However, in no case do the compounds contain more than one nitro group. One or both of the hydrogen atoms of the sulfonamide group may be replaced by alcohol radicals, e. g., methyl, ethyl, isoamyl, $\beta$-hydroxyethyl, $\beta$-methoxyethyl, allyl, benzyl, tetrahydrofurfuryl, cyclohexyl, $\beta$-hydroxy-$\beta$-ethoxyethyl, cetyl, lauryl, $\beta$-sulfoethyl or $\beta$-sulfatoethyl. As acid-binding agents, the alkali metal carbonates are advantageously employed. Alkaline earth bicarbonates, alkali metal bicarbonates, alkaline earth carbonates, tertiary amines, or other acid-binding agents can be employed.

Advantageously, the monocyclic aromatic primary amine is employed in excess (about 1.1 mole for each mole of halogen-containing nitrobenzenesulfonamide). The excess amine can be removed after the condensation by steam distillation, or where the amine is not readily steam distillable, it can be dissolved in dilute acid, e. g., 1 to 5 per cent aqueous hydrochloric or sulfuric acid, and the dye filtered from the resulting solution. Where the amine is neither steam distillable nor soluble in dilute acids, the dye is advantageously separated from the excess amine by extraction with a suitable solvent. Our new dyes are all yellow in color.

The following examples will serve to illustrate our new dyes and the manner of obtaining the same.

*Example 1.—2-nitro-4-sulfonamidodiphenylamine*

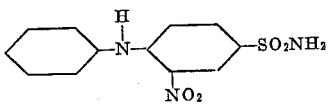

In a flask, fitted with a mechanical stirrer, were placed 92.4 g. (1.1 moles) of sodium carbonate and 102.3 g. (1.1 moles) of aniline. The stirrer was started and the mixture in the flask heated to 125° C. To the hot mixture were added portionwise 236 g. (1 mole) of 4-chloro-3-nitrobenzene sulfonamide, so that the reaction does not become too vigorous. After the addition, heating was continued for 6 hours at 125° to 135° C. The reaction mixture was permitted to cool and then was steam distilled to remove unreacted aniline. The yellow dye remaining with the aqueous still liquors was filtered off, washed with water and dried in the air. It melted at 178° to 180° C.

*Example 2.—2-nitro-4-sulfonamido-4'-methyldiphenylamine*

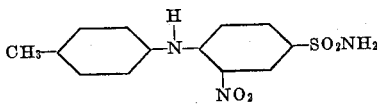

This dye was prepared exactly as in Example 1, using 117.9 g. (1.1 moles) of p-toluidine instead of 102.3 g. of aniline. The yellow dye melted at 187° to 190° C.

*Example 3.—2-nitro-4-sulfonamido-4'-ethoxydiphenylamine*

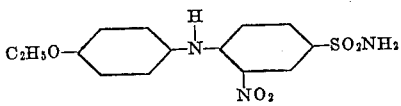

This dye was prepared exactly as in Example 1, using 150.8 g. (1.1 moles) of p-phenetidine instead of 102.3 g. of aniline. The yellow orange dye melted at 161° to 163° C.

*Example 4.—2-nitro-4-sulfonamido-4'-chlorodiphenylamine*

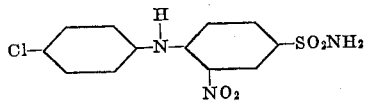

This dye was prepared exactly as in Example 1, except that 140 g. (1.1 moles) of p-chloraniline were used instead of 102.3 g. of aniline, and instead of steam distilling, the excess p-chloraniline was dissolved by adding 3 per cent sulfuric acid to the reaction mixture. The yellow dye was filtered from the resulting aqueous solution, washed in water and dried in the air. It melted at 227° to 230° C.

*Example 5.—2-nitro-4-sulfonamido-4'-hydroxydiphenylamine*

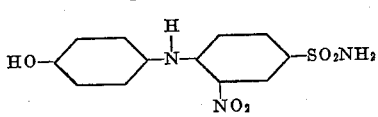

This dye was prepared exactly as in Example 1, except that 120 g. (1.1 moles) of p-aminophenol were employed instead of 102.3 g. of aniline, and instead of steam distilling, the excess p-aminophenol was dissolved by adding 3 per cent sulfuric acid to the reaction mixture. The yellow dye was filtered from the resulting aqueous solution, washed with water and dried in the air. It melted at 228° to 230° C.

*Example 6.—2-nitro-4-sulfonamido-2'-ethoxydiphenylamine*

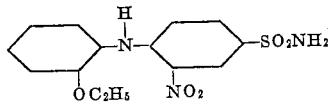

This dye was prepared exactly as in Example 1, using 150.8 g. (1.1 moles) of o-phenetidine instead of 102.3 g. of aniline. The yellow dye melted at 171° to 172° C.

*Example 7.—2-nitro-4-sulfonamido-4'-methylacetaminodiphenylamine*

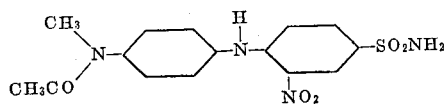

This dye was prepared exactly as in Example 1, except that 180 g. (1.1 moles) of N-methyl-N-acetyl-p-phenylenediamine were used instead of 102.3 g. of aniline, and instead of steam distilling, the excess N-methyl-N-acetyl-p-phenylenediamine was dissolved by adding 3 per cent sulfuric acid to the reaction mixture. The yellow dye was filtered from the resulting solution, washed with water and dried in the air. It melted at 245° to 249° C.

*Example 8.—2-nitro-4-sulfonamido-4'-cyanomethyldiphenylamine*

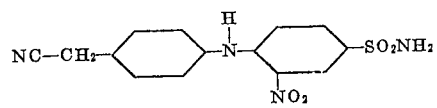

This dye was prepared exactly as in Example 1, except that 155 g. (1.1 moles) of p-aminophenylacetonitrile were employed instead of 102.3 g. of aniline. The yellow dye melted at 245° to 250° C.

*Example 9.—2-nitro-4-sulfonamido-4'-(p-phenylazophenyl)-diphenylamine*

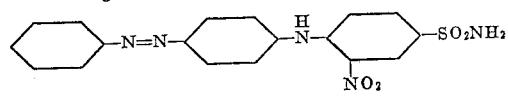

This dye was prepared exactly as in Example 1, except that 216.9 g. (1.1 moles) of p-aminoazobenzene were employed instead of 102.3 g. of aniline, and instead of steam distilling, the solid material in the cooled reaction mixture, which consisted of the yellow dye and excess p-aminoazobenzene, was filtered off and recrystallized from ethyl alcohol until the yellow dye was free from p-aminoazobenzene. The yellow dye melted at 172° to 174° C.

*Example 10.—2-nitro-4-sulfonethylamido-4'-methoxydiphenylamine*

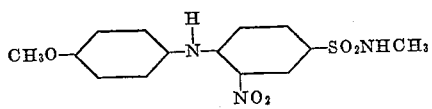

This dye was prepared exactly as in Example 1, except that 135.3 g. (1.1 moles) of p-anisidine were employed instead of 102.3 g. of aniline, and 264 g. (1 mole) of 4-chloro-3-nitrobenzenesulfonethylamide were employed instead of 236 g. of 4-chloro-3-nitrobenzenesulfonamide. The yellow dye melted at 122° to 124° C.

*Example 11.—2-nitro-4-sulfondimethylamido-4'-methyldiphenylamine*

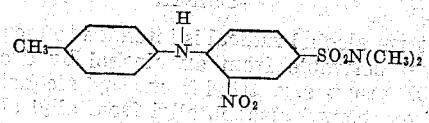

This dye was prepared exactly as in Example 1, using 117.9 g. (1.1 moles) of p-toluidine instead of 102.3 g. of aniline, and employing 264 g. (1 mole) of 4-chloro-3-nitrobenzene-sulfondimethylamide instead of 236 g. of 4-chloro-3-nitrobenzenesulfonamide. The yellow dye melted at 83° to 90° C.

*Example 12.—2-nitro-4-sulfonmethoxyethylamido-4'-ethoxydiphenylamine*

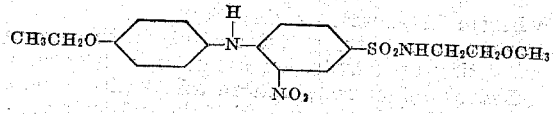

This dye was prepared exactly as in Example 1, except that 150.8 g. (1.1 moles) of p-phenetidine were employed instead of 102.3 g. of aniline, and 294 g. (1 mole) of 4-chloro-3-nitrobenzene-sulfonmethoxyethylamide were employed instead of 236 g. of 4-chloro-3-nitrobenzenesulfonamide. The yellow dye melted at 137° to 140° C.

*Example 13.—2-nitro-4-sulfon-β-hydroxyethylamido-4'-ethoxydiphenylamine*

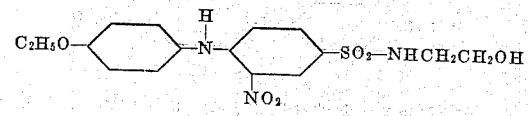

This dye was prepared exactly as in Example 1, except that 150.8 g. (1.1 moles) of p-phenetidine were employed instead of 102.3 g. of aniline, and 280 g. (1 mole) of 4-chloro-3-nitrobenzene-β-hydroxyethylsulfonamide were employed instead of 236 g. of 4-chloro-3-nitrobenzenesulfonamide. The yellow dye melted at 165° to 167° C.

*Example 14.—2-nitro-4-sulfonhydrazidodiphenylamine*

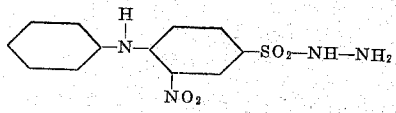

This dye was prepared exactly as in Example 1, except that 251 g. (1 mole) of 4-chloro-3-nitrobenzene sulfonhydrazide were employed instead of 236 g. of 4-chloro-3-nitrobenzene sulfonamide. The yellow dye melted at 86° to 94° C.

*Example 15.—2-nitro-4-sulfontetrahydrofurfurylamidodiphenylamine*

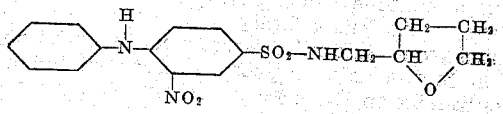

This dye was prepared exactly as in Example 1, except that 320 g. (1 mole) of 4-chloro-3-nitrobenzene sulfontetrahydrofurfurylsulfonamide were employed instead of 236 g. of 4-chloro-3-nitrobenzenesulfonamide. The yellow dye melted at 101° to 104° C.

In a manner similar to that illustrated in the above examples the following additional diphenylamine compounds were prepared:

| Diphenylamine | M. P., °C. |
|---|---|
| 2-nitro-4-sulfonamido-4'-(β-hydroxyethoxy) | 190–193 |
| 2-nitro-4-sulfonamido-4'-acetamino | 250–253 |
| 2-nitro-4-sulfonamido-4'-methoxy | 218–222 |
| 2-nitro-4-sulfonamido-2'-methoxy | 220–222 |
| 2-nitro-4-sulfonamido-2'-chloro | 245–250 |
| 2-nitro-4-sulfonamido-4'-aceto | 180–186 |
| 2-nitro-4-sulfonamido-2',5'-dimethoxy | 165–170 |
| 2-nitro-4-sulfonamido-2'-ethoxy-5'-acetamino | above 270 |
| 2-nitro-4-sulfonamido-4'-phenoxy | 185–188 |
| 2-nitro-4-sulfonamido-2',4',6'-trimethyl | 235–240 |
| 2-nitro-4-sulfonamido-3'-trifluoromethyl | 178–183 |
| 2-nitro-4-sulfonamido-2',6'-dimethoxy | 232–236 |
| 2-nitro-4-sulfonamido-2'-methyl | 170–174 |
| 2-nitro-4-sulfonamido-4'-butoxy | 208–211 |
| 2-nitro-4-sulfonmethylamido | 146–148 |
| 2-nitro-4-sulfonmethylamido-4'-methyl | 240–243 |
| 2-nitro-4-sulfonmethylamido-4'-methoxy | 164–166 |
| 2-nitro-4-sulfonethylamido | 150–152 |
| 2-nitro-4-sulfonethylamido-4'-methoxy | 122–124 |
| 2-nitro-4-sulfonethylamido-4'-ethoxy | 97–99 |
| 2-nitro-4-sulfonbutylamido | 142–144 |
| 2-nitro-4-sulfonisopropylamido | 141–144 |
| 2-nitro-4-sulfon-β-methoxyethylamido | 88–90 |
| 2-nitro-4-sulfon-β-methoxyethylamido-4'-methyl | 115–117 |
| 2-nitro-4-sulfon-β-hydroxyethylamido | 90–92 |
| 2-nitro-4-sulfondimethylamido | 129–131 |
| 2-nitro-4-sulfontetrahydrofurfurylamido-4'-methoxy | 110–112 |

The 4-chloro-3-nitrobenzene sulfonamide employed in some of the examples above was prepared by the method of P. Fischer (Ber. 24, 3190) by condensing 4-chloro-3-nitrobenzene sulfonyl chloride with ammonium carbonate, or better by adding 2.5 moles of dilute ammonium hydroxide to a slurry of one mole of 4-chloro-3-nitrobenzene sulfonyl chloride. The sulfonamide melts at 25 to 35° C. and boils at 175° to 176° C. 4-chloro-3-nitrobenzene sulfonyl chloride was prepared by condensing sodium 4-chloro-3-nitrobenzene sulfonate with phosphorous pentachloride (P. Fischer, Ber. 24, 3190) or by the action of 3 parts by weight of freshly distilled chlorosulfonic acid on one part of the sodium salt of 4-chloro-3-nitrobenzene sulfonic acid at 150° C. for several hours. 4-chloro-3-nitrobenzene sulfonyl chloride melts at 61° to 62° C. uncor. 4-chloro-3-nitrobenzene sulfonic acid was prepared by sulfonating o-chloronitrobenzene with fuming sulfuric acid according to the method of P. Fischer (B 24, 3187).

4-chloro-3-nitrobenzene sulfonamides in which one or both hydrogen atoms of the sulfonamide group are replaced by alcohol radicals were prepared by condensing 4-chloro-3-nitrobenzene sulfonyl chloride with amines. To prepare 4-chloro-3-nitrobenzene sulfonmethylamide, one mole of 4-chloro-3-nitrobenzene sulfonyl chloride was dissolved in 500 cc. of acetone, and to this solution were added, with stirring, two moles of methyl amine (30 per cent water solution). The temperature was kept at 10° to 20° C. during the entire reaction. One hour after the addition of the methyl amine was completed, 3 volumes of cold water were added to the reaction mixture. The 4-chloro-3-nitrobenzene sulfonmethylamide which precipitated was filtered off, washed with water and dried in the air. It melted at 61° to 63° C. In an exactly similar manner, the following were prepared using the appropriate amine in each case:

| Sulfonamide | M. P., °C. |
|---|---|
| 4-chloro-3-nitrobenzene dimethyl | 99–100 |
| 4-chloro-3-nitrobenzene isopropyl | 73–75 |
| 4-chloro-3-nitrobenzene tetrahydrofurfuryl | 75–77 |
| 4-chloro-3-nitrobenzene β-methoxyethyl | 81–83 |
| 4-chloro-3-nitrobenzene ethyl | 97–100 |
| 4-chloro-3-nitrobenzene β-hydroxyethyl | 115–117 |
| 4-chloro-3-nitrobenzene butyl | 69–71 |

The 4-chloro-3-nitrobenzenesulfonhydrazide was prepared by adding 4-chloro-3-nitrobenzene sulfonyl chloride to a slight excess of hydrazine in water solution. It melted at 136° to 137° C.

The new diphenylamine compounds of our invention are of greatest utility for the coloration of textile materials comprising organic derivatives of cellulose. However they may be used for the coloration of non-vegetable textile fibers, in general. Thus they can be used to color organic derivatives of cellulose, silk, wool, nylon, "Vinyon" and protein synthetic wools. Also, cellulose ester and cellulose ether lacquers, as well as lacquers from vinyl compounds can be colored. The coloration produced by the diphenylamine compounds of our invention is yellow.

Typical organic derivatives of cellulose that can be colored include the hydrolyzed, as well as the unhydrolyzed, cellulose carboxylic esters, such as cellulose acetate, cellulose propionate and cellulose butyrate, and the hydrolyzed, as well as the unhydrolyzed mixed cellulose carboxylic esters, such as cellulose acetate propionate and cellulose acetate butyrate, and the cellulose ethers such as methyl cellulose, ethyl cellulose and benzyl cellulose.

The diphenylamine compounds of our invention are, for the most part, relatively insoluble in water and, accordingly, they may be advantageously directly applied to the textile material undergoing coloration in the form of an aqueous suspension which can be prepared by grinding the dye to a paste, in the presence of a sulfonated oil, soap, or other suitable dispersing agent and dispersing the resulting paste in water. In some instances, the compounds may possess sufficient solubility in water to render the use of a dispersing agent unnecessary. Generally speaking, however, the use of a dispersing agent is desirable.

Direct dyeing operations can, with advantage, be conducted at temperatures of about 75° to 85° C., but any suitable temperature may be used. Thus, the textile material to be dyed or colored is ordinarily added to the dye bath at a temperature lower than that at which the main portion of the dyeing is to be effected, a temperature of from 45° to 55° C., for example, following which the temperature is raised to that selected for carrying out the operation. The temperature at which the dyeing operation is continued may vary somewhat depending upon the particular material undergoing coloration. As is understood by those skilled in the art, the intensity of dyeing can be varied by varying the proportion of dye to the material undergoing coloration. Generally speaking, 1 to 3% by weight of dye to material is employed, although any desired proportions can be used.

Suitable dispersing agents are disclosed in our United States Patent 2,115,030, issued April 26, 1938. The process disclosed in this patent for the dyeing of cellulose acetate can be used in applying the dyes of the present invention to cellulose acetate. While a satisfactory method for dyeing has been disclosed herein, it will be understood that any other suitable methods for dyeing the non-vegetable textile materials named herein can be employed. Lacquers may be colored with the dye compounds of our invention by the methods customarily employed in the lacquer art.

The term nylon is intended to describe a linear polyamide resin, such as set forth in United States Patent 2,071,250, dated February 16, 1937.

The term sulfonamido is intended to mean a group of the following formula:

—SO$_2$NH$_2$

The term alcohol radical is intended to mean any radical derivable from an alcohol by dropping the OH group, e. g., ethyl from ethyl alcohol, benzyl from benzyl alcohol, allyl from allyl alcohol, tertiary butyl from tertiary butyl alcohol, etc.

What we claim as our invention and desire to be secured by Letters Patent of the United States is:

1. A yellow dye compound of the following general formula:

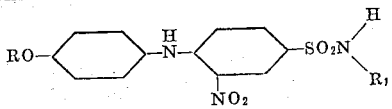

wherein R represents an alkyl group and R$_1$ represents a member selected from the group consisting of a hydrogen atom, an alkyl group, a hydroxyalkyl group and an alkoxyalkyl group.

2. A yellow dye compound of the following general formula:

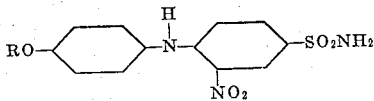

wherein R represents an alkyl group.

3. A yellow dye compound of the following formula:

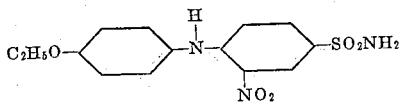

4. A process for preparing a diphenylamine compound comprising condensing, in the presence of an acid-binding agent, a monocyclic primary aromatic amine of the benzene series with a monocyclic compound containing a benzene nucleus and containing on the benzene nucleus a halogen atom and only one nitro group, said nitro group being in ortho position to the halogen atom, said compound also containing on the benzene nucleus in para position to the halogen atom a

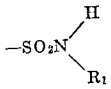

group wherein R$_1$ represents a member selected from the group consisting of a hydrogen atom, an alkyl group, a hydroxyalkyl group and an alkoxyalkyl group.

5. A process for preparing a diphenylamine compound comprising condensing, in the presence of an alkali metal bicarbonate acid-binding agent, a monocyclic primary aromatic amine of the benzene series with a monocyclic compound containing a benzene nucleus and containing on the benzene nucleus a halogen atom and only one nitro group, said nitro group being in ortho position to the halogen atom, said compound also containing on the benzene nucleus in para position to the halogen atom a

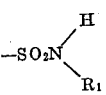

group wherein R$_1$ represents a member selected from the group consisting of a hydrogen atom, an alkyl group, a hydroxyalkyl group and an alkoxyalkyl group.

6. A process for preparing a diphenylamine compound comprising condensing, in the presence of a sodium bicarbonate acid-binding agent, a monocyclic primary aromatic amine of the benzene series with a monocyclic compound containing a benzene nucleus and containing on the benzene nucleus a halogen atom and only one nitro group, said nitro group being in ortho position to the halogen atom, said compound also containing on the benzene nucleus in para position to the halogen atom a

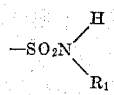

group wherein $R_1$ represents a member selected from the group consisting of a hydrogen atom, an alkyl group, a hydroxyalkyl group and an alkoxyalkyl group.

7. A process for preparing 2-nitro-4-sulfonamido-diphenylamine comprising condensing, in the presence of an acid-binding agent, aniline with 4-chloro-3-nitrobenzene sulfonamide.

JAMES G. McNALLY.
JOSEPH B. DICKEY.

REFERENCES CITED

The following references are of record in the file of this patent:

UNITED STATES PATENTS

| Number | Name | Date |
|---|---|---|
| 1,709,292 | Wagner | Apr. 16, 1929 |
| 2,080,704 | Fischer | May 18, 1937 |

OTHER REFERENCES

Northey, Chem. Reviews, vol. 27, No. 1, August 1940, page 140.

Fischer, Berichte Deut. Chem. Ges., vol. 24 (1891), pages 3793–94 and 95.

Certificate of Correction

June 10, 1947.

Patent No. 2,422,029.

JAMES G. McNALLY ET AL.

It is hereby certified that errors appear in the printed specification of the above numbered patent requiring correction as follows: Column 3, line 60, Example 4, strike out "in" first occurrence, and insert instead *with*; column 4, lines 45 and 46, Example 9, for "(p-phenylazophenyl)" read *phenylazo*; same column, line 65, Example 10, for that portion of the formula reading "—SO$_2$NHCH$_3$" read —*SO$_2$NHC$_2$H$_5$*; column 5, line 17, Example 12, for "sulfonmethoxyethylamido" read *sulfon-β-methoxyethylamido*; same example, lines 28 and 29, for "nitrobenzenesulfonmethoxyethylamide" read *nitrobenzenesulfon-β-methoxyethylamide*; same column, Example 15, line 71, for "sulfontetrahydrofurfurylsulfonamide" read *sulfontetrahydrofurfurylamide*; column 6, line 42, for "uncor" read *uncorrected*; and that the said Letters Patent should be read with these corrections therein that the same may conform to the record of the case in the Patent Office.

Signed and sealed this 23rd day of September, A. D. 1947.

[SEAL]

THOMAS F. MURPHY,
*Assistant Commissioner of Patents.*